(12) United States Patent
Yang (10) Patent No.: US 11,385,878 B2
(45) Date of Patent: Jul. 12, 2022

(54) MODEL DEPLOYMENT METHOD, MODEL DEPLOYMENT DEVICE AND TERMINAL EQUIPMENT

(71) Applicant: Shenzhen Intellifusion Technologies Co., Ltd., Guangdong (CN)

(72) Inventor: Haihui Yang, Guangdong (CN)

(73) Assignee: Shenzhen Intellifusion Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/468,702

(22) Filed: Sep. 8, 2021

(65) Prior Publication Data
US 2022/0100486 A1   Mar. 31, 2022

(30) Foreign Application Priority Data
Sep. 29, 2020   (CN) .......................... 202011050556.3

(51) Int. Cl.
G06F 8/60 (2018.01)
G06N 3/10 (2006.01)
G06K 9/62 (2022.01)

(52) U.S. Cl.
CPC ............ *G06F 8/60* (2013.01); *G06K 9/6262* (2013.01); *G06N 3/10* (2013.01)

(58) Field of Classification Search
CPC ........................................................ G06F 8/60
USPC ....................................................... 717/174
See application file for complete search history.

(56) References Cited

U.S. PATENT DOCUMENTS

| 11,074,058 B1* | 7/2021 | Mowatt | G06F 8/64 |
| 2002/0144256 A1* | 10/2002 | Budhiraja | G06F 8/656 |
| | | | 717/174 |
| 2016/0162800 A1* | 6/2016 | Qin | G06N 3/0454 |
| | | | 706/12 |

(Continued)

FOREIGN PATENT DOCUMENTS

| CN | 104615466 A | 5/2015 |
| CN | 111274034 A | 6/2020 |
| CN | 111338693 A * | 6/2020 |

OTHER PUBLICATIONS

Song et al. 2020. Model-based fleet deployment of edge computing applications. In Proceedings of the 23rd ACM/IEEE International Conference on Model Driven Engineering Languages and Systems (MODELS '20). Association for Computing Machinery, New York, NY, USA, 132-142. (Year: 2020).*

(Continued)

*Primary Examiner* — James D. Rutten (57) ABSTRACT

The present disclosure applied to a model deployment field provides a model deployment method, a model deployment device and a terminal equipment. The model deployment method includes: dividing a preset to-be-deployed model into at least two to-be-deployed modules, according to property information respectively corresponding to at least two layers of the preset to-be-deployed model; generating a deployment file according to each of the at least two to-be-deployed modules, wherein the deployment file includes deployment information configured for deploying each of the at least two to-be-deployed modules; and sending the deployment file to a specified chip to indicate the specified chip to deploy the to-be-deployed model according to the deployment file. The present disclosure can efficiently deploy an algorithm model to a chip.

12 Claims, 5 Drawing Sheets

(56) References Cited

U.S. PATENT DOCUMENTS

| | | | | |
|---|---|---|---|---|
| 2018/0075357 | A1* | 3/2018 | Subramanian | G06N 20/00 |
| 2019/0036716 | A1* | 1/2019 | Kasaragod | G06N 3/08 |
| 2020/0311607 | A1* | 10/2020 | Mestres | G06Q 30/0201 |
| 2020/0342370 | A1* | 10/2020 | Kucheria | G06N 3/0454 |
| 2021/0117869 | A1* | 4/2021 | Plumbley | G06N 20/20 |
| 2021/0248002 | A1* | 8/2021 | Li | G06N 20/00 |

OTHER PUBLICATIONS

De Niz, D., & Rajkumar, R. (2006). Partitioning bin-packing algorithms for distributed real-time systems. International Journal of Embedded Systems, 2(3-4), 196-208. (Year: 2006).*

L. Gong, C. Wang, X. Li, H. Chen and X. Zhou, "MALOC: A Fully Pipelined FPGA Accelerator for Convolutional Neural Networks With All Layers Mapped on Chip," in IEEE Transactions on Computer-Aided Design of Integrated Circuits and Systems, vol. 37, No. 11, pp. 2601-2612, Nov. 2018 (Year: 2018).*

\* cited by examiner

MODEL DEPLOYMENT METHOD, MODEL DEPLOYMENT DEVICE AND TERMINAL EQUIPMENT

TECHNICAL FIELD

The present disclosure generally relates to model deployment fields, and especially relates to a model deployment method, a model deployment device and a terminal equipment.

DESCRIPTION OF RELATED ART

With continuous progress of artificial intelligence, various kinds of machine learning models and other algorithm models have been developed. However, a large amount of data is involved in current algorithm models, so that the models are relatively complex. Therefore, it is difficult to deploy the machine learning model to a chip for applications due to a complex deployment process for consuming a large amount of computing resources on the chip.

Therefore, a new method for efficiently deploying the algorithm model to the chip is needed to be designed.

SUMMARY

The technical problems to be solved: in view of the shortcomings of the related art, the present disclosure relates to a model deployment method, a model deployment device and a terminal equipment which can efficiently deploy an algorithm model to a chip.

In a first respect, a model deployment method according to an embodiment of the present disclosure includes:

dividing a preset to-be-deployed model into at least two to-be-deployed modules, according to property information respectively corresponding to at least two layers of the preset to-be-deployed model;

generating a deployment file according to each of the at least two to-be-deployed modules, wherein the deployment file includes deployment information configured for deploying each of the at least two to-be-deployed modules; and sending the deployment file to a specified chip to indicate the specified chip to deploy the to-be-deployed model according to the deployment file.

In a second respect, a model deployment device according to an embodiment of the present disclosure includes:

a dividing unit configured to divide a preset to-be-deployed model into at least two to-be-deployed modules, according to property information respectively corresponding to at least two layers of the preset to-be-deployed model;

a generating unit configured to generate a deployment file according to each of the at least two to-be-deployed modules, wherein the deployment file includes deployment information configured for deploying each of the at least two to-be-deployed modules; and a sending unit configured to send the deployment file to a specified chip to indicate the specified chip to deploy the to-be-deployed model according to the deployment file.

In a third respect, a terminal equipment according to an embodiment of the present disclosure includes a memory, a processor and computer programs stored in the memory and performed by the processor, when the computer programs are performed by the processor, the terminal equipment can be configured to implement steps of the model deployment method above mentioned in the first aspect.

In a fourth respect, a computer readable storage medium according to an embodiment of the present disclosure is configured to store computer programs, when the computer programs are performed by a processor, the terminal equipment can be configured to implement steps of the model deployment method above mentioned in the first aspect.

In a fifth respect, a computer program product according to an embodiment of the present disclosure is configured to be performed by a terminal equipment, when the computer programs are performed by a processor, the terminal equipment can be configured to implement steps of the model deployment method above mentioned in the first aspect.

Comparing with the related art, the present disclosure provides the advantages as below. It can be seen that, in an embodiment of the present disclosure, the to-be-deployed model is divided into the at least two to-be-deployed modules according to the property information respectively corresponding to at least two layers in the preset to-be-deployed model. At this moment, data amount of a single to-be-deployed module is more reasonable relative to the to-be-deployed model, so as to facilitate subsequent acquisition of deployment information. And then, generating the deployment file according to each of the at least two to-be-deployed modules, and sending the deployment file to the specified chip to indicate the specified chip to deploy the to-be-deployed model according to the deployment file. Wherein the deployment file includes the deployment information configured for deploying each of the at least two to-be-deployed modules. Therefore, a specified chip can be configured to separately deploy each of the at least two to-be-deployed modules according to the deployment file, in this way, the data amount of the single to-be-deployed module is more reasonable relative to the to-be-deployed model, and information processing resources of the specified chip can be used more reasonably and efficiently in the deployment process, so that a corresponding algorithm model can be deployed to the chip efficiently.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the art, other drawings can be obtained according to the drawings below on the premise of no creative work.

DETAILED DESCRIPTION

In the following description, specific details such as structures of a specific system, a technology, etc. are provided for illustration rather than qualification purposes for thoroughly understanding of embodiments of the present disclosure. However, one of ordinary skill in the art should be aware that the present disclosure can be realized in other embodiments without these specific details. In other cases, detailed descriptions of well-known systems, devices, circuits, and methods are omitted so that the description of the present disclosure can't be precluded by unnecessary details.

In order to illustrate the technical solution of the present disclosure, specific embodiments are described in detail below.

It can be understood that, when used in the specification and the attached claims, the term "include" is indicated that features, wholes, steps, operations, elements and/or components described exist, without excluding to exist or add one or more other features, wholes, steps, operations, elements, components and/or collections thereof.

It can be also understood that the terms used herein are intended only to describe specific embodiments rather than being intended to limit the present disclosure. As described in the specification and the attached claims, the singular terms "one", "a" and "the" are intended to include the plural, unless the context clearly indicates otherwise.

It should also be further understood that the term "and/or" described in the specification and the attached claims is indicated that any combination and all possible combinations of one or more of the items is listed in relation to each other, and include the combinations thereof.

As described in the specification and the attached claims, the term "if" can be interpreted in context as "when . . . " or "once" or "responding to determine" or "responding to detect". Similarly, the phrases "if determining" or "if detecting [described conditions or events]" can be interpreted depending on contexts to mean "once determining" or "in response to determine" or "once detecting [described conditions or events]" or "in response to detect [described conditions or events]".

In addition, in the description of the present disclosure, terms "first", "second", "third", etc., are used only to distinguish the description rather than indicating or implicating a relative importance between elements thereof.

Figure 1:
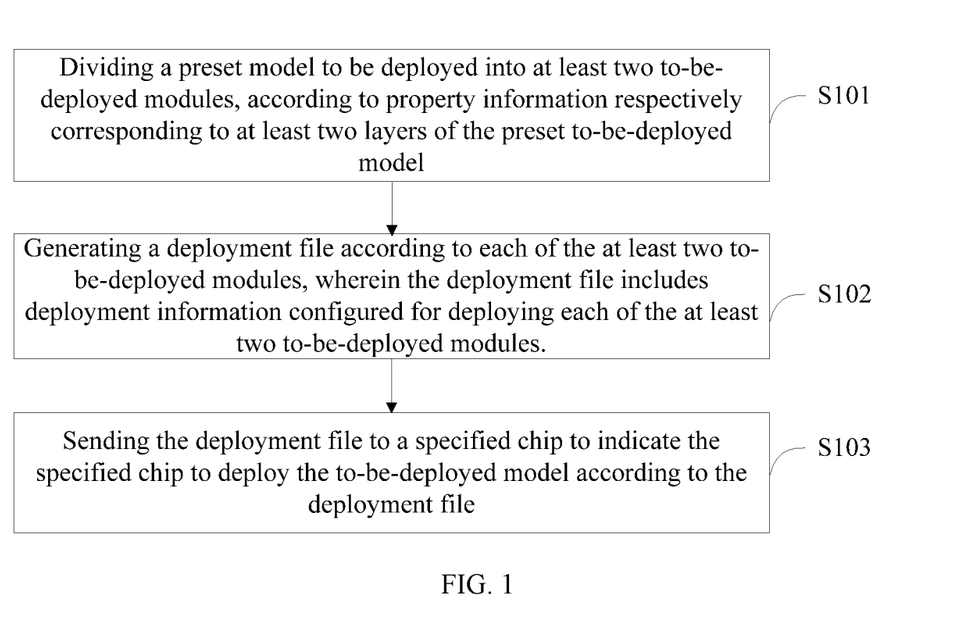
FIG. 1 is a flowchart of a model deployment method in accordance with a first embodiment of the present disclosure.

A first embodiment:

FIG. 1 is a flowchart of a model deployment method in accordance with a first embodiment of the present disclosure. The model deployment method can be applied to a terminal equipment.

The terminal equipment can be a server, a desktop computer, a mobile phone, a tablet computer, a wearable device, a vehicle-mounted device, an augmented reality (AR)/virtual reality (VR) device, a laptop, an ultra-mobile personal computer (UIVIPC), a netbook, a personal digital assistant (PDA), etc., specific types of the terminal equipment are not limited to the present disclosure.

The terminal equipment can be configured to form communication connection establishment with a specified chip to carry out information transmission therebetween. A specific algorithm model, such as a machine learning model, can be deployed in the specified chip. In some examples, the specified chip can be an Artificial Intelligence (AI) chip. The specified chip can include a Neural Network Processor (NNP) configured to perform linear operations and a Digital Signal Processing (DSP) configured to perform nonlinear operations. Of course, the specified chip can also be set as other structures for specific scenarios.

The communication connection includes a plurality of types such as a Bluetooth connection, a Wi-Fi connection, other wireless connections, and a wired connection.

A message transmission can be established between the terminal equipment and the specified chip based on a Remote Procedure Call (RPC) protocol, in this way, a function on the specified chip can be invoked by the terminal equipment with a form of the function, thus, the function on the specified chip can be invoked by the terminal equipment and an invoke result can be obtained to realize a verification of functions on the specified chip.

Referring to FIG. 1, the model deployment method includes:

step S101, dividing a preset to-be-deployed model into at least two to-be-deployed modules, according to property information respectively corresponding to at least two layers of the preset to-be-deployed model.

In an embodiment of the present disclosure, the to-be-deployed model can include a plurality of kinds of types, such as a classification model, a detection model of the machine learning model, and so on. The classification model can be configured to identify categories of input items such as images or texts, and the detection model can be configured to detect locations of a target object in the input items, etc. In addition, the to-be-deployed model can also be other algorithms, such as a traditional algorithm or a combination of the traditional algorithm and the machine learning model, etc.

The property information can include information transmission modes, operation type information and data quantity information, etc. The information transmission mode can be configured to indicate that an information transmission mode of a corresponding layer is a parallel transmission mode or a serial transmission mode, or both the parallel transmission mode and the serial transmission mode. Therefore, the to-be-deployed module divided according to the information transmission mode can be configured to determine a deployment form according to a corresponding information transmission mode. For example, for a plurality of to-be-deployed modules that are processed in parallel with each other, when deployed in the specified chip, the plurality of to-be-deployed modules that are processed in parallel with each other can be correspondingly deployed to a plurality of data processing resources that are processed in parallel in the specified chip. The operation type information can be configured to indicate that a corresponding layer includes a linear operation or a nonlinear operation. The data quantity information can be configured to reflect calculation amount involved in the corresponding layer, so as to reflect a calculation time of the corresponding layer, therefore, computing resources can be allocated according to the data quantity information.

In an embodiment of the present disclosure, the to-be-deployed model can include at least two layers, and each of the at least two layers is configured to perform a specific processing operation on the input data. For example, if the to-be-deployed model includes a convolutional neural network model, the to-be-deployed model can include at least one of a convolution layer, a pooling layer, an activation layer and a full connection layer. If the to-be-deployed model includes a traditional algorithm, the to-be-deployed model can be layered according to a function of the data processing operation, a function type involved and data processing information in the traditional algorithm.

In an embodiment of the present disclosure, the to-be-deployed model can be divided according to the property information, so that the layers with the same or similar properties can be divided into the same to-be-deployed module, so that it is convenient to uniformly allocate matching data processing resources. Or, different layers that can be processed in parallel are divided into different to-be-deployed modules, so that the different to-be-deployed modules can be deployed to different data processing resources that can be processed in parallel, thereby data processing efficiency can be improved when the to-be-deployed model that has been deployed are performed in the specified chip. At the same time, the amount of data in a single to-be-deployed module is smaller relative to the to-be-deployed model. In a subsequent processing process, a pressure of relevant resources to deploy and process the to-be-deployed module is less than that of the to-be-deployed model, so as to further improve the efficiency of deployment and processing.

In some embodiments of the present disclosure, before the step of dividing a preset to-be-deployed model into the at least two to-be-deployed modules, according to the property information respectively corresponding to the at least two layers of the preset to-be-deployed model, the model deployment method further includes:

obtaining an original model that floating point numbers are applied therein; and performing a fixed-point operation on the original model to obtain the to-be-deployed model.

The floating point numbers can be applied in the original model, such as data of double types. Data only in a form of 25 bit can be applied to the specific chip, that is, binary data. Thus, a fixed-point operation of the floating point number can be performed before the to-be-deployed model is deployed in the specified chip. The fixed-point operation can be performed according to conventional modules and functions.

In an embodiment of the present disclosure, the original model can be a model developed in a preset model framework. For example, the preset model framework can be a model framework such as a MXNet, a Caffe, and a TensorFlow, etc. The to-be-deployed model can be obtained by performing the fixed-point operation on the original model, and then, dividing the to-be-deployed model into the at least two modules and performing subsequent operations according to the property information respectively corresponding to at least two layers in the preset to-be-deployed model, so that a subsequent model deployed by the specific chip according to the deployment file is a model capable of being performed by the specified chip.

In practical applications, comparing with the original model, the to-be-deployed model obtained by performing the fixed-point operation, can be configured to omit some decimals during performing a calculation on the to-be-deployed model, so that accuracy loss is occurred relative to the original model. Therefore, after the to-be-deployed model has been deployed in the specified chip, detecting an accuracy change of the to-be-deployed model that has been deployed relative to the original model, so as to verify performances of the to-be-deployed model that has been deployed.

Step S102, generating the deployment file according to each of the at least two to-be-deployed modules, wherein the deployment file includes the deployment information configured for deploying each of the at least two to-be-deployed modules.

In an embodiment of the present disclosure, the deployment file can be configured to indicate for separately deploying each to-be-deployed module. For example, the deployment information can include at least one of structure parameter information, storage size information, storage address information, deployment location information and machine codes of each to-be-deployed module. The deployment file can have a plurality of specific forms, for example, the deployment file can be one file or can include more than two files.

In some embodiments of the present disclosure, the property information includes operation type information configured to instruct that a corresponding layer is configured to perform a linear operation or a nonlinear operation. The deployment information of the deployment file includes deployment locations corresponding to each of the at least two to-be-deployed modules that are determined according to the operation type information. The deployment location of any one of the at least two to-be-deployed modules is a digital signal processor or a neural network processor.

In an embodiment of the present disclosure, the property information can include the operation type information, at this moment, the to-be-deployed model can be divided according to operation types of each layer, and the deployment location of each to-be-deployed module can be determined as the digital signal processor or the neural network processor, according to corresponding operation types.

If the to-be-deployed model is the machine learning model and includes the convolution layer, the activation layer and the pooling layer, a single convolution layer or a plurality of contiguous convolution layers in the to-be-deployed model can be divided into a to-be-deployed module A. Moreover, since the convolution layer involves the linear operation, a deployment location of the to-be-deployed module A is the neural network processor of the specified chip. As the activation layer involves the nonlinear operation, the activation layer can be divided into a to-be-deployed module B, and a deployment location of the to-be-deployed module B is the digital signal processor of the specified chip.

It is needed to illustrate that, in an embodiment of the present disclosure, the layers with the same operation type can be divided into the same to-be-deployed module, or the layers can be divided according to hierarchical orders of the layers in the to-be-deployed model. For example, if according to a preset hierarchical order, the to-be-deployed model includes a convolution layer A, a convolution layer B, an activation layer C, a convolution layer D and an activation layer E, the to-be-deployed model can be divided into a to-be-deployed module C' including the convolution layer A and the convolution layer B, a to-be-deployed module D' including the activation layer C, a to-be-deployed module E' including the convolution layer D and a to-be-deployed module F' including the activation layer E.

In an embodiment of the present disclosure, the to-be-deployed model can be divided according to the operation types of each layer, and the deployment location of each to-be-deployed module can be determined as the digital signal processor or the neural network processor according to the corresponding operation types, in this way, in the subsequent deployment process, the specified chip can quickly determine the deployment location of the to-be-deployed module and deploy the to-be-deployed module according to the deployment file, thus improving a speed of a model deployment.

In some embodiments of the present disclosure, the property information includes information transmission modes configured to indicate that an information transmission mode of a corresponding layer includes a parallel transmission mode and/or a serial transmission mode, the deployment information of the deployment file including data processing resources respectively corresponding to each of the at least two to-be-deployed modules and determined according to the information transmission modes of the layers in the to-be-deployed modules.

The information transmission mode can be configured to indicate that an information transmission mode of a corresponding layer is a parallel transmission mode or a serial transmission mode, or both the parallel transmission mode and the serial transmission mode. Therefore, the to-be-deployed module divided according to the information transmission mode can be configured to determine a deployment form according to a corresponding information transmission mode. For example, for a plurality of to-be-deployed modules that are processed in parallel with each other, when deployed in the specified chip, the plurality of to-be-deployed modules that are processed in parallel with each other can be correspondingly deployed to a plurality of data processing resources that are processed in parallel in the specified chip. For a plurality of to-be-deployed modules needed to be processed serially, the plurality of to-be-deployed modules needed to be processed serially can be deployed to the same data processing resource.

In an embodiment of the present disclosure, the to-be-deployed model is divided according to the information transmission modes of each layer, in the subsequent deployment process, the specified chip can be configured to reasonably deploy each to-be-deployed module to a specific data processing resource according to the information transmission modes between the plurality of to-be-deployed modules. In this way, when performing the to-be-deployed model that has been deployed, each data processing resource can be reasonably configured to perform data processing operations on each layer of the to-be-deployed model, which can improve an operation speed of the to-be-deployed model that that has been deployed.

In some embodiments of the present disclosure, the property information includes data quantity information configured to indicate that amount of data is involved in the corresponding layer, the deployment information of the deployment file including computing resources respectively corresponding to each to-be-deployed module and determined according to the data quantity information of the layers in the to-be-deployed module.

In an embodiment of the present disclosure, the data quantity information can be configured to reflect calculation amount involved in the corresponding layer, so as to reflect the calculation time of the corresponding layer, therefore, the computing resources can be allocated according to the data quantity information so as to improve the operation speed of the to-be-deployed model that has been deployed.

In some embodiments of the present disclosure, the deployment file includes a first file and a second file. The first file includes setup parameter information of the to-be-deployed model, and the second file includes structural orders of each of the at least two to-be-deployed modules in the to-be-deployed model, and module deployment information of each of the at least two to-be-deployed modules stored in turn.

In an embodiment of the present disclosure, the setup parameter information can be obtained by training the to-be-deployed model. For example, the setting parameter information can include weight information of the convolution layer in the to-be-deployed model, and vector information of each convolution kernel, and so on.

In the second file, the module deployment information of each to-be-deployed module can be stored successively according to the structural orders of each to-be-deployed module in the to-be-deployed model. For example, in the to-be-deployed model, the structural orders of each to-be-deployed module are the to-be-deployed module C, the to-be-deployed module D, the to-be-deployed module E and the to-be-deployed module F, respectively. And then, module deployment information C of the to-be-deployed module C, module deployment information D of the to-be-deployed module D, module deployment information E of the to-be-deployed module E, and module deployment information F of the to-be-deployed module F can be stored successively in the second file. In addition, in some embodiments of the present disclosure, the second file can also include header information including at least one of basic information such as a number of the to-be-deployed modules, a storage space required by the to-be-deployed module during deployment, a size of the first file, a size of the second file, and so on.

In some embodiments of the present disclosure, since data only in the form of bit can be applied in the specific chip, that is, binary data, therefore, the deployment file can be a binary file.

A concrete example of a concrete implementation of the second file in the deployment file is shown below.

For example, the first file can be named model.bin, the second file can be named net.bin, and the to-be-deployed module can be named block. And, the second file can include a header structure and the module deployment information of each to-be-deployed module stored sequentially according to the structure orders of each to-be-deployed module in the to-be-deployed model. Block_i_info is module deployment information of an i-th to-be-deployed module in the second file.

Information stored in the net.bin file is shown in Table 1 below.

TABLE 1

| | Parameter | Statement |
|---|---|---|
| Header structure | Block_number | The number of to-be-deployed modules |
| | DDR_size | A storage space needed that the specified chip is configured to perform the to-be-deployed model |
| | net_bin_size | A size of the second file |
| | model_bin_size | A size of the first file |
| | reserve | Adding parameters later, and ensuring that a size of the header structure is a preset size |
| Block_1_info | Block_id | A first to-be-deployed module stored in the second file |
| | Block_type | The to-be-deployed module is performed in an NNP or a DSP |
| | Block_size | A size of Block_1_info |
| | Inner_ddr_start | Representing an offset address that a storage space required by the to-be-deployed module is relative to a storage space allocated in the header structure |
| | Inner_size | A size of a sub-storage space of performing the to-be-deployed module |
| | Model_bin_start | An offset address of parameters in the first file for performing the to-be-deployed module |
| | Block_bin_size | A size of machine codes performed by the to-be-deployed module |
| | Block_bin | The machine codes for performing the to-be-deployed module in the specified chip |
| ... | ... | ... |
| Block_n_info | ... | ... |

In an embodiment of the present disclosure, the first file includes the setup parameter information of the to-be-deployed model, therefore, in the subsequent deployment process of the to-be-deployed model, the to-be-deployed model in the specified chip can be efficiently set up by reading the first file. The second file includes the structural orders of each to-be-deployed module in the to-be-deployed model, and the module deployment information of each to-be-deployed module stored in turn. Therefore, in the process of reading the to-be-deployed model, the specified chip can be configured to deploy the layers sequentially according to structural settings of the to-be-deployed model. That is to say, the deployment orders of the to-be-deployed model in the specified chip match with information processing orders of the to-be-deployed model itself, thus, not only the deployment efficiency, but also the efficiency of subsequently invoking each to-be-deployed module and information transmission when performing the to-be-deployed module on the specified chip, can be improved.

Step S103, sending the deployment file to the specified chip to indicate the specified chip to deploy the to-be-deployed model according to the deployment file.

In some examples, the terminal equipment according to an embodiment of the present disclosure can be performed by sending the deployment file to the specified chip based on a Remote Procedure Call (RPC) protocol, so as to indicate that the specified chip is configured to deploy the to-be-deployed model according to the deployment file.

After the specified chip receives the deployment file, the specified chip is configured to parse the deployment file by a preset resolution rule to read the deployment information for each to-be-deployed module, and allocate a storage space to deploy the to-be-deployed module, according to the read deployment information. In some examples, the storage space in the specified chip can be a Double Data Rate Synchronous Dynamic Random Access Memory (DDR SDRAM). The Data Rate Synchronous Dynamic Random Access Memory can also be called DDR. Of course, the specified chip can be other types of memories.

Specifically, in a specific example, an invoking tool based on the RPC protocol can be developed in advance so that the terminal equipment can be configured to invoke the specified chip. Furthermore, the terminal equipment sends the second file net.bin and the first file model.bin to the specified chip through the invoking tool. A parser is predefined on the specified chip and configured to obtain the deployment information of each to-be-deployed module block according to a preset reading mode of the second file net.bin. Thus, a network structure of the to-be-deployed model and machine code information to perform the to-be-deployed model on the specified chip can be analyzed by the parser, and a corresponding DDR space is allocated on the specified chip.

In an embodiment of the present disclosure, the to-be-deployed model is divided into the at least two to-be-deployed modules according to the property information respectively corresponding to at least two layers in the preset to-be-deployed model. At this moment, data amount of a single to-be-deployed module is more reasonable relative to the to-be-deployed model, so as to facilitate subsequent acquisition of deployment information. And then, generating the deployment file according to each of the at least two to-be-deployed modules, and sending the deployment file to the specified chip to indicate the specified chip to deploy the to-be-deployed model according to the deployment file. Wherein the deployment file includes the deployment information configured for deploying each of the at least two to-be-deployed modules. Therefore, a specified chip can be configured to separately deploy each of the at least two to-be-deployed modules according to the deployment file, in this way, the data amount of the single to-be-deployed module is more reasonable relative to the to-be-deployed model, and information processing resources of the specified chip can be used more reasonably and efficiently in the deployment process, so that a corresponding algorithm model can be deployed to the chip efficiently.

Figure 2:
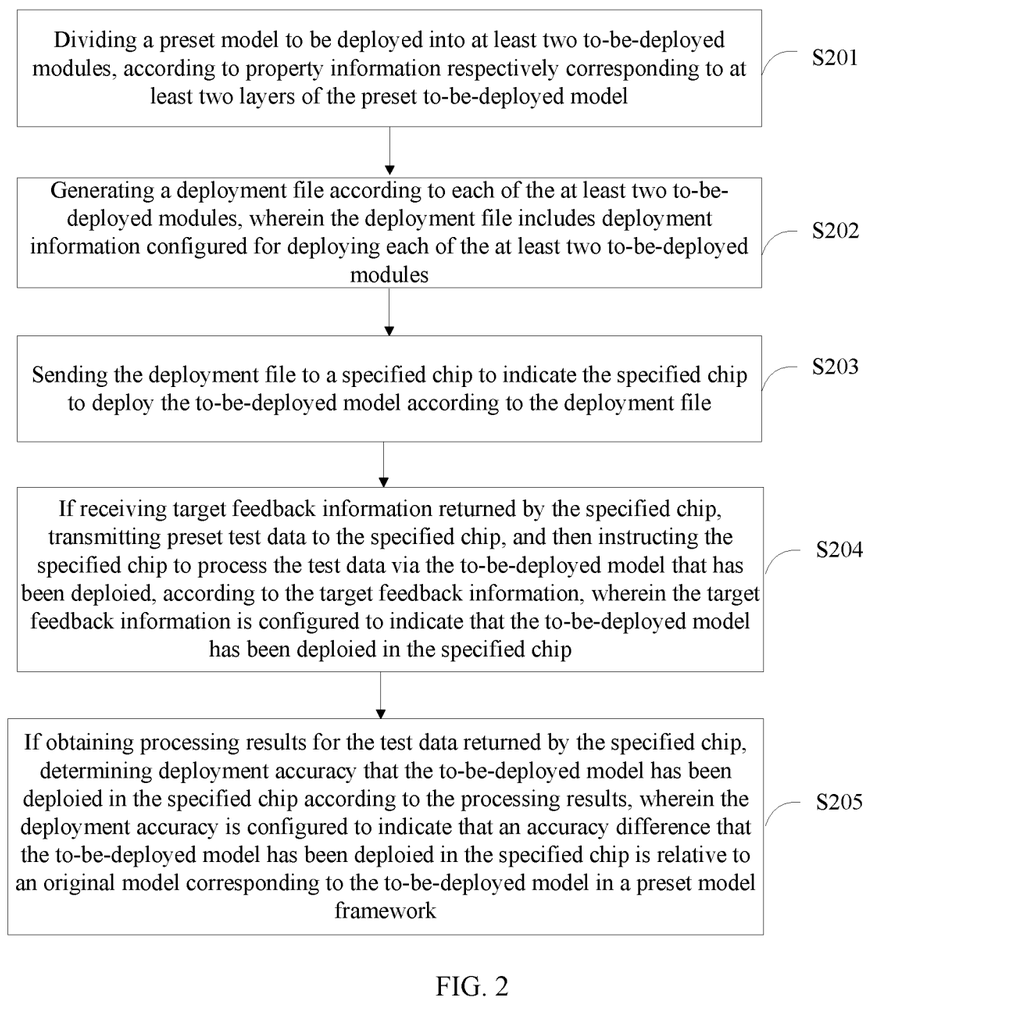
FIG. 2 is a flowchart of a model deployment method in accordance with a second embodiment of the present disclosure.

A second embodiment:

FIG. 2 is a flowchart of a model deployment method in accordance with a second embodiment of the present disclosure.

Referring to FIG. 2, the model deployment method includes:

step S201, dividing a preset to-be-deployed model into at least two to-be-deployed modules, according to property information respectively corresponding to at least two layers of the preset to-be-deployed model;

step S202, generating a deployment file according to each of the at least two to-be-deployed modules, wherein the deployment file includes deployment information configured for deploying each of the at least two to-be-deployed modules;

step S203, sending the deployment file to a specified chip to indicate the specified chip to deploy the to-be-deployed model according to the deployment file;

step S204, if receiving target feedback information returned by the specified chip, transmitting preset test data to the specified chip, and then indicate the specified chip to process the test data via the to-be-deployed model that has completed by deployment, according to the target feedback information; wherein the target feedback information is configured to indicate that the to-be-deployed model has been deployed in the specified chip.

step S205, if obtaining processing results for the test data returned by the specified chip, determining deployment accuracy that the to-be-deployed model has been deployed in the specified chip according to the processing results; wherein the deployment accuracy is configured to indicate that an accuracy difference that the to-be-deployed model has been deployed in the specified chip is relative to an original model corresponding to the to-be-deployed model in a preset model framework.

Furthermore, the steps S201-S203 are the same or similar to the steps S101-S103 of the first embodiment, details can be referred to relevant description of the steps S101-S103 of the first embodiment, which is not be repeated here.

After sending the deployment file to the specified chip, if the target feedback information returned by the specified chip is received, it can be determined that the to-be-deployed model has been deployed in the specified chip. However, in practical applications, compared with the original model of the to-be-deployed model, due to an influence of the fixed-point operation, an accuracy loss is generated on the to-be-deployed model that has been deployed in the specified chip relative to the original model. So, in an embodiment of the present disclosure, after the to-be-deployed model has been deployed in the specified chip, the to-be-deployed model has been deployed in the specified chip can be further invoked by the terminal equipment, to further detect accuracy changes of the to-be-deployed model relative to the original model, so as to efficiently verify performances of the to-be-deployed model and find performance anomalies of the to-be-deployed model in time after deployment.

Furthermore, the test data can include a plurality of to-be-tested items and standard results corresponding to each of the plurality of to-be-tested items, respectively. The test data can have a plurality of types such as pictures, videos, texts, and/or audios, etc. The type of the test data can be determined according to the to-be-deployed model, which is not limited here.

In some embodiments of the present disclosure, data only in the form of bit can be applied to the specific chip, that is, binary data. Before performing the step S204, obtaining original test data and then converting the original test data into binary format data to obtain the test data with a binary format.

In some embodiments of the present disclosure, the target feedback information can include preset transmission interface information.

Correspondingly, if receiving the target feedback information returned by the specified chip, transmitting the preset test data to the specified chip, and then indicating the specified chip to process the test data via the to-be-deployed model that has been deployed, according to the target feedback information, includes:

if receiving the preset transmission interface information returned by the specified chip, transmitting the test data to the specified chip, and then indicating the specified chip to process the test data via the to-be-deployed model that has been deployed, according to the preset transmission interface information.

Furthermore, if receiving the preset transmission interface information returned by the specified chip, it is indicated that the specified chip allows the terminal equipment to invoke a particular function of the specified chip through the preset transmission interface information. That is to say, at this time, the terminal equipment can transmit the test data to the specified chip according to the preset transmission interface information, and indicate the specified chip to process the test data through the to-be-deployed model that has been deployed.

In some examples, the terminal equipment can be configured to transmit the test data to the specified chip based on the Remote Procedure Call (RPC) protocol, and indicate the specified chip to process the test data through the to-be-deployed model that has been deployed.

Specifically, in a specific example, the invoking tool based on the RPC protocol can be developed in advance so that the terminal equipment can invoke the specified chip.

Furthermore, the invoking tool can include:

a Load_host tool: the terminal equipment can send the second file net.bin and the first file model.bin to the specified chip by invoking the Load_host tool. A parser is predefined on the specified chip and configured to obtain the deployment information of each to-be-deployed module block according to a preset reading mode of the second file net.bin. Thus, a network structure of the to-be-deployed model and machine code information to perform the to-be-deployed model on the specified chip can be analyzed by the parser, and a corresponding DDR space is allocated on the specified chip.

After the terminal equipment sends the second file net.bin and the first file model.bin to the specified chip through the Load_host tool, the specified chip can return the target feedback information including the preset transmission interface information to the terminal equipment.

A set_input tool: the terminal equipment can convert the original test data in the terminal equipment into the binary test data by invoking the set_input tool, and then send the binary test data to the specified chip;

a run tool: the terminal equipment can trigger the specified chip to perform the to-be-deployed model that has been deployed by invoking the run tool, according to the network structure and the machine code information analyzed by the parser.

A get_output tool: the terminal equipment can obtain processing results for the test data that the to-be-deployed model that has been deployed in the specified chip by invoking the get_output tool.

Figure 3:
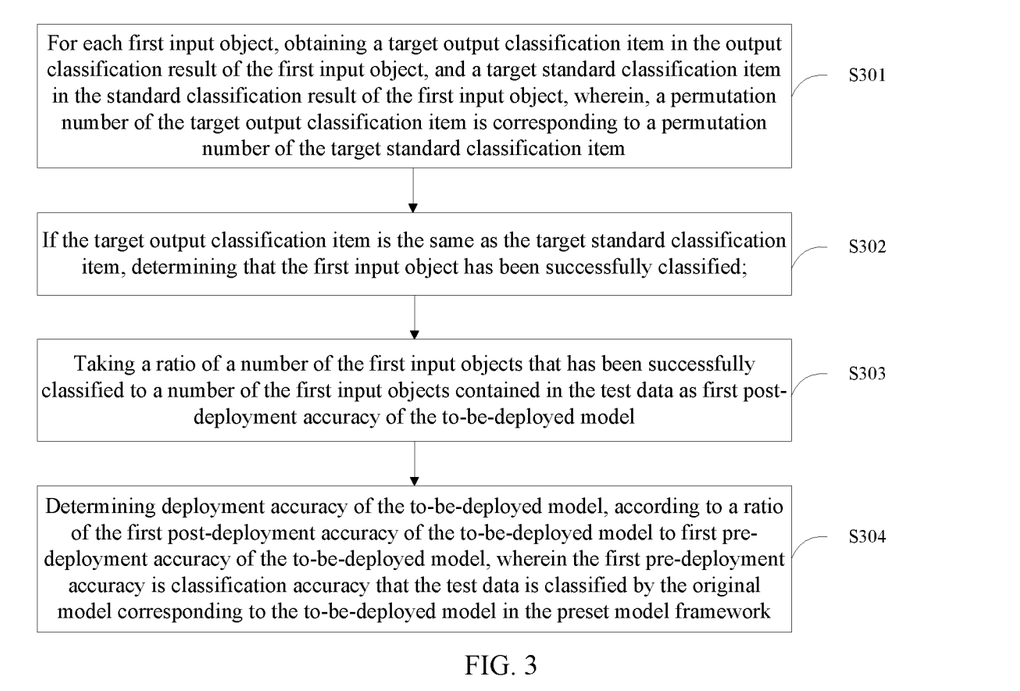
FIG. 3 is a flowchart of a model deployment method in accordance with a third embodiment of the present disclosure.

In some embodiments of the present disclosure, the to-be-deployed model includes a classification model, and the test data includes a plurality of first input objects and a standard classification result corresponding to each of the plurality of first input objects, the standard classification result corresponding to each of the plurality of first input objects including a plurality of standard classification items and a standard confidence corresponding to each of the plurality of standard classification items; for each first input object, sorting a sequence number corresponding to each standard classification item of the first input object according to a size of the standard confidence corresponding to each standard classification item of the first input object;

the processing results including output classification results corresponding to each of the plurality of first input objects, the output classification result corresponding to each of the plurality of the first input objects including a plurality of output classification items and an output confidence corresponding to each of the plurality of output classification items; for each first input object, sorting a sequence number corresponding to each output classification item of the first input object according to a size of the output confidence corresponding to each output classification item of the first input object;

the step of if obtaining processing results for the test data returned by the specified chip, determining deployment accuracy that the to-be-deployed model has been deployed in the specified chip according to the processing results, includes:

step S301, for each first input object, obtaining a target output classification item in the output classification result of the first input object, and a target standard classification item in the standard classification result of the first input object, wherein, a sequence number of the target output classification item is corresponding to a sequence number of the target standard classification item;

step S302, if the target output classification item is the same as the target standard classification item, determining that the first input object has been successfully classified;

step S303, taking a ratio of a number of the first input objects that has been successfully classified to a number of the first input objects contained in the test data as first post-deployment accuracy of the to-be-deployed model; and step S304, determining deployment accuracy of the to-be-deployed model, according to a ratio of the first post-deployment accuracy of the to-be-deployed model to first pre-deployment accuracy of the to-be-deployed model; wherein the first pre-deployment accuracy is classification accuracy that the test data is classified by the original model corresponding to the to-be-deployed model in the preset model framework.

In an embodiment of the present disclosure, the classification model can be configured to identify a category of the first input object. For example, the first input object can be a picture, a video, a text, etc. Each output classification item in the output classification result can be in a sorted state, that is, for each first input object, in the output classification result, sequence numbers respectively corresponding to each output classification item of the plurality of first input objects are sorted according to the size of the output confidence respectively corresponding to each output classification item of the plurality of first input objects. Moreover, each standard classification item in the standard classification result is also in a sorted state. At this moment, for each first input object, in the standard classification result, sequence numbers respectively corresponding to each standard classification item of the plurality of first input objects are sorted according to the size of the standard confidence respectively corresponding to each standard classification item of the plurality of first input objects.

It is understood that initial classification results output from the test data after the test data is processed by the to-be-deployed model that has been deployed can be output classification results, or, each output classification item in the initial classification result can be in a state of out-of-order. At this time, for each of the plurality of first input objects, in the initial classification results, sorting each standard classification item of the first input object according to the standard confidence corresponding to each output classification item of the first input object, to obtain a sequence number corresponding to each standard classification item of the first input object.

In an embodiment of the present disclosure, both the sequence number of the target output classification item and the sequence number of the target standard classification item can be preset. A corresponding way of the sequence number of the target output classification item and the sequence number of the target standard classification item can be determined according to a setting way of the sequence number of the output classification item and the sequence number of the standard classification item.

For example, the sequence numbers of the output classification items can be arranged according to an order from the largest to the smallest of corresponding output confidences, and the sequence numbers of the standard classification items can be arranged according to an order from the largest to the smallest of corresponding standard confidences. Then, when both the sequence number of the target output classification item and the sequence number of the target standard classification item are one, the sequence number of the target output classification item corresponds to the sequence number of the target standard classification item. Or, there are two target output classification items that corresponding sequence numbers are respectively one and two, and there are two target standard classification items that corresponding sequence numbers are also respectively one and two. At this time, the target output classification item with the sequence number of one corresponds to the target standard classification item with the sequence number of one, while, the target output classification item with the sequence number of two corresponds to the target standard classification item with the sequence number of two. Correspondingly, the target output classification item is the same as the target standard classification item, according to a corresponding way between the sequence number of the target output classification item and the sequence number of the target standard classification item. For example, the target output classification item with the sequence number of one is the same as the target standard classification item with the sequence number of one, while, the target output classification item with the sequence number of two is the same as the target standard classification item with the sequence number of two.

When each of the sequence number of the target output classification item and the sequence number of the target standard classification item is one, the target output classification item can be an output classification item with the highest output confidence among the output classification results of the first input object, while, the target standard classification item can be a standard classification item with the highest standard confidence among the standard classification results of the first input object.

If the target output classification item is the same as the target standard classification item, such as, both are first specified objects, then, it can be determined that the first input object is successfully classified, that is, it can be determined that a classification of the first input object by the to-be-deployed model that has been deployed in the specified chip is correct. If the target output classification item is different from the target standard classification item, that is to say, if the output classification item with the highest output confidence is the first specified object, and the standard classification item with the highest standard confidence is a second specified object, the first input object is incorrectly classified by the to-be-deployed model that has been deployed, that is to say, it is determined that the first input object is unsuccessfully classified.

Of course, the sequence number of the target output classification item and the sequence number of the target standard classification item can also be selected from other sequence numbers, and a number of the target output classification items and the target standard classification items can also be more than one. Specific settings can be determined according to actual scenarios.

Furthermore, determining deployment accuracy of the to-be-deployed model, according to the ratio of the first post-deployment accuracy of the to-be-deployed model to the first pre-deployment accuracy of the to-be-deployed model, can include: if the ratio of the first post-deployment accuracy to the first pre-deployment accuracy is greater than a first preset threshold, the deployment accuracy of the to-be-deployed model can be considered to meet a preset condition. For example, the first preset threshold can be 99.5%.

Through an embodiment of the present disclosure, deployment accuracy of a classification model can be accurately evaluated after the classification model is deployed in the specified chip, so as to find whether classification performance of the classification model that has been deployed is abnormal.

Figure 4:
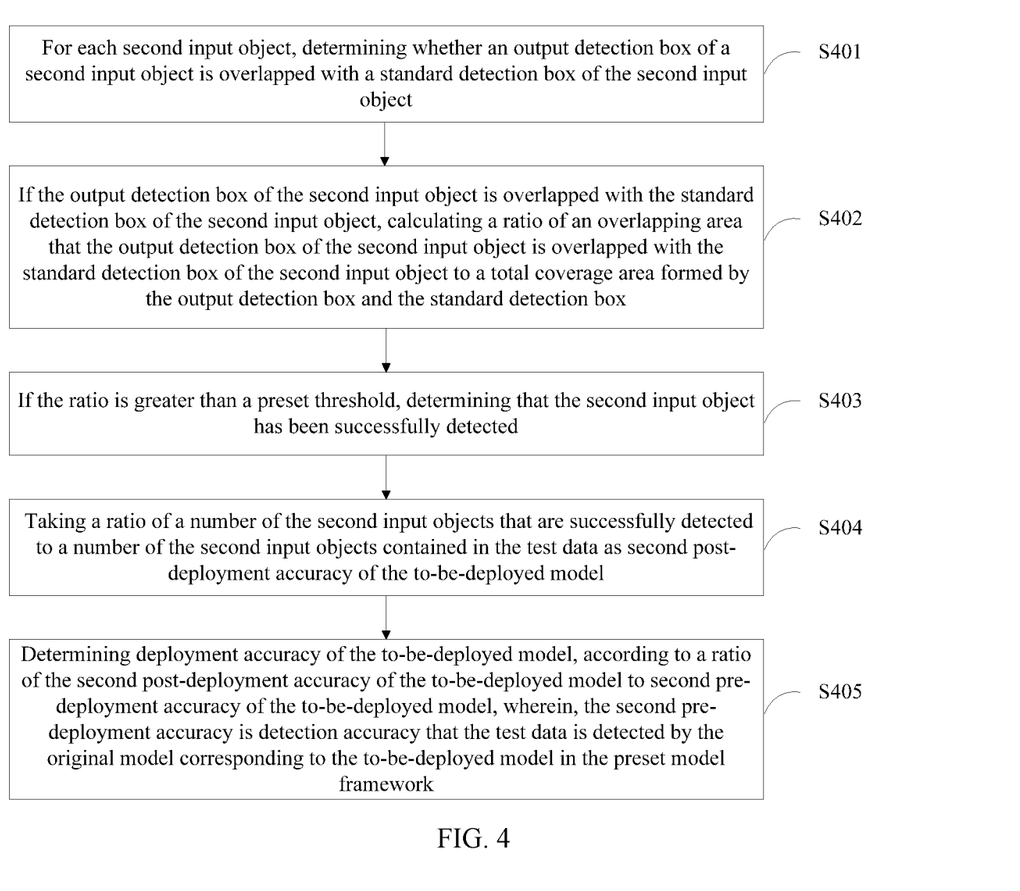
FIG. 4 is a flowchart of a model deployment method in accordance with a fourth embodiment of the present disclosure.

In some embodiments of the present disclosure, the to-be-deployed model includes a detection model, the test data includes a plurality of second input objects and a standard detection box corresponding to each of the plurality of second input objects, and the processing results include an output detection box corresponding to each of the plurality of second input objects;

the step of if obtaining processing results for the test data returned by the specified chip, determining deployment accuracy that the to-be-deployed model has been deployed in the specified chip according to the processing results, includes:

step S401, for each second input object, determining whether the output detection box of the second input object is overlapped with the standard detection box of the second input object;

step S402, if the output detection box of the second input object is overlapped with the standard detection box of the second input object, calculating a ratio of an overlapping area that the output detection box of the second input object is overlapped with the standard detection box of the second input object to a total coverage area formed by the output detection box and the standard detection box;

step S403, if the ratio is greater than a preset threshold, determining that the second input object has been successfully detected;

step S404, taking a ratio of a number of the second input objects that are successfully detected to a number of the second input objects contained in the test data as second post-deployment accuracy of the to-be-deployed model; and step S405, determining deployment accuracy of the to-be-deployed model, according to a ratio of the second post-deployment accuracy of the to-be-deployed model to second pre-deployment accuracy of the to-be-deployed model; wherein the second pre-deployment accuracy of detecting the test data in the preset model framework through the original model corresponding to the to-be-deployed model.

In an embodiment of the present disclosure, the detection model can be configured to detect a location and other information of the target object in the second input object. For example, the second input object can be a picture, a video, a text, etc.

In an embodiment of the present disclosure, whether the second input object is successfully detected can be determined by relative changes between the output detection box of the second input object and the standard detection box of the second input object. Furthermore, the relative changes between the output detection box of the second input object and the standard detection box of the second input object can be determined by whether the output detection box and the standard detection box are overlapped with each other, and a proportion of the overlapping area relative to the total coverage area.

Furthermore, there is a plurality of ways to determine whether the output detection box of the second input object overlaps with the standard detection box of the second input object. Specifically, it can be determined according to shapes of the output detection box and the standard detection box. For example, if both the output detection box and the standard detection box are rectangular, it can be determined according to a location relationship of at least two vertex coordinates of the output detection box and the standard detection box, respectively.

The step of determining the deployment accuracy of the to-be-deployed model, according to the ratio of the second post-deployment accuracy to the second pre-deployment accuracy of the to-be-deployed model, can include: if the ratio of the second post-deployment accuracy to the second pre-deployment accuracy of the to-be-deployed model is greater than a second preset threshold, the deployment accuracy of the to-be-deployed model can be considered to meet the preset condition. For example, the second preset threshold can be 98%.

Through an embodiment of the present disclosure, deployment accuracy of a detection model can be accurately evaluated after the detection model has been deployed in the specified chip, so as to find whether detection performance of the detection model that has been deployed is abnormal.

In some embodiments of the present disclosure, the standard detection box corresponding to each of the second input objects is identified by an upper left standard coordinate (x1, y1) and a lower right standard coordinate (x2, y2), and the output detection box corresponding to each of the second input objects is identified by an upper left output coordinate (xx1, yy1) and a lower right output coordinate (xx2, yy2);

the step of for each second input object, determining whether the output detection box of the second input object is overlapped with the standard detection box of the second input object, including:

if xxx1 is less than xxx2, and yyy1 is less than yyy2, determining that the output detection box of the second input object is overlapped with the standard detection box of the second input object; wherein xxx1 is a greater one of x1 and xx1, xxx2 is a smaller one of x2 and xx2, yyy1 is a greater one of y1 and yy1, and yyy2 is a smaller one of y2 and yy2;

the step of if the output detection box of the second input object is overlapped with the standard detection box of the second input object, calculating a ratio of the overlapping area that the output detection box of the second input object is overlapped with the standard detection box of the second input object to the total coverage area formed by the output detection box and the standard detection box, including:

if the output detection box of the second input object is overlapped with the standard detection box of the second input object, calculating the overlapping area according to xxx2, xxx1, yyy2 and yyy1, and calculating the total coverage area according to the upper left standard coordinate, the lower right standard coordinate, the upper left output coordinate, the lower right output coordinate, xxx2, xxx1, yyy2 and yyy1; and calculating the ratio of the overlapping area to the total coverage area.

In an embodiment of the present disclosure, both the output detection box and the standard detection box can be rectangular, the standard detection box and the output detection box can be identified by two coordinates, respectively.

Furthermore, if the output detection box of the second input object is overlapped with the standard detection box of the second input object, it can be calculated that the overlapping area is (XXX2−XXX1)*(yyy2−yyy1), and the total coverage area is (y1−y2)*(x2−x1)+(yy1−yy2)*(xx2−xx1)−(xxx2−xxx1)*(yyy2−yyy1);

it is calculated that the ratio of the overlapping area that the output detection box of the second input object is overlapped with the standard detection box of the second input object to the total coverage area, is:

(xxx2−xxx1)*(yyy2−yyy1)/[(y1−y2)*(x2−x1)+(yy1−yy2)*(xx2−xx1)−(xxx2−xxx1)*(yyy2−yyy1)].

In an embodiment of the present disclosure, a method to determine whether the output detection box of the input object overlaps with the standard detection box of the input object is of less computation, so that calculation results can be configured to calculate the overlapping area and the total coverage area at the same time, thereby high calculation efficiency can be obtained.

It should be understood that sequence numbers of the steps in the above embodiments do not imply orders to be performed, sequences that each process is performed shall be determined by its function and internal logics, rather than to constitute any limitation to perform the embodiments of the present disclosure.

Figure 5:
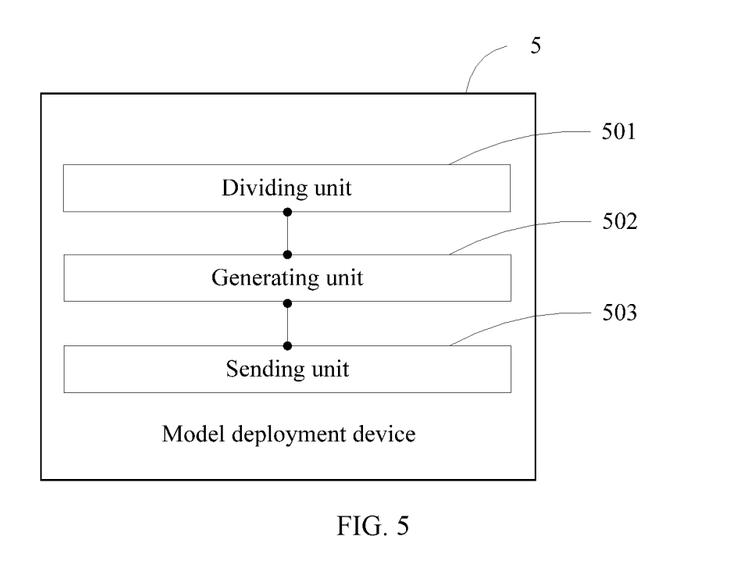
FIG. 5 is a schematic diagram of a model deployment device in accordance with an embodiment of the present disclosure.

A third embodiment:

FIG. 5 is a schematic diagram of a model deployment device in accordance with an embodiment of the present disclosure, For ease of illustration, only those parts that are relevant to the third embodiment of the present disclosure are shown:

The model deployment device 5 includes:

a dividing unit 501 configured to divide a preset to-be-deployed model into at least two to-be-deployed modules, according to property information respectively corresponding to at least two layers of the preset to-be-deployed model;

a generating unit 502 configured to generate a deployment file according to each of the at least two to-be-deployed modules, wherein the deployment file includes deployment information configured for deploying each of the at least two to-be-deployed modules; and a sending unit 503 configured to send the deployment file to the specified chip to indicate the specified chip to deploy the to-be-deployed model according to the deployment file.

The property information includes operation type information configured to indicate that a corresponding layer is configured to perform a linear operation or a nonlinear operation; the deployment information of the deployment file including deployment locations corresponding to each of the at least two to-be-deployed modules that are determined according to the operation type information. The deployment location of any one of the at least two to-be-deployed modules is a digital signal processor or a neural network processor.

The model deployment device 5 further includes:

a transmission unit configured to, if receiving target feedback information returned by the specified chip, transmit preset test data to the specified chip, and then indicate the specified chip to process the test data via the to-be-deployed model that has been deployed, according to the target feedback information, wherein the target feedback information is configured to indicate that the to-be-deployed model has been deployed in the specified chip; and a determining unit configured to, if obtaining processing results for the test data returned by the specified chip, determine deployment accuracy that the to-be-deployed model has been deployed in the specified chip according to the processing results; wherein the deployment accuracy is configured to indicate that an accuracy difference that the to-be-deployed model has been deployed in the specified chip is relative to an original model corresponding to the to-be-deployed model in a preset model framework.

The to-be-deployed model includes a classification model, and the test data includes a plurality of first input objects and a standard classification result corresponding to each of the plurality of first input objects, the standard classification result corresponding to each of the plurality of first input objects including a plurality of standard classification items and a standard confidence corresponding to each of the plurality of standard classification items; for each first input object, sorting a sequence number corresponding to each standard classification item of the first input object according to a size of the standard confidence corresponding to each standard classification item of the first input object;

the processing results including output classification results corresponding to each of the plurality of first input objects, the output classification result corresponding to each of the plurality of the first input objects including a plurality of output classification items and an output confidence corresponding to each of the plurality of output classification items; for each first input object, sorting a sequence number corresponding to each output classification item of the first input object according to a size of the output confidence corresponding to each output classification item of the first input object the determining unit specifically including:

an obtaining sub-unit configured to, for each first input object, obtain a target output classification item in the output classification result of the first input object, and a target standard classification item in the standard classification result of the first input object; wherein, a sequence number of the target output classification item is corresponding to a sequence number of the target standard classification item;

a first determining sub-unit configured to, if the target output classification item is the same as the target standard classification item, determine that the first input object has been successfully classified;

a first comparing sub-unit configured to, take a ratio of a number of the first input objects that has been successfully classified to a number of the first input objects contained in the test data as first post-deployment accuracy of the to-be-deployed model;

a second determining sub-unit configured to determine deployment accuracy of the to-be-deployed model, according to a ratio of the first post-deployment accuracy of the to-be-deployed model to first pre-deployment accuracy of the to-be-deployed model; wherein the first pre-deployment accuracy is classification accuracy that the test data is classified by the original model corresponding to the to-be-deployed model in the preset model framework.

The to-be-deployed model includes a detection model, and the test data includes a plurality of second input objects and a standard detection box corresponding to each of the plurality of second input objects, the processing results including an output detection box corresponding to each of the plurality of second input objects;

the determining unit specifically including:

a judgment sub-unit configured to, for each second input object, determine whether the output detection box of the second input object is overlapped with the standard detection box of the second input object;

a calculating sub-unit configured to, if the output detection box of the second input object is overlapped with the standard detection box of the second input object, calculate a ratio of an overlapping area that the output detection box of the second input object is overlapped with the standard detection box of the second input object to a total coverage area formed by the output detection box and the standard detection box;

a third determining sub-unit configured to, if the ratio is greater than a preset threshold, determine that the second input object has been successfully detected;

a second comparing sub-unit configured to, take a ratio a number of the second input objects that are successfully detected to a number of the second input objects contained in the test data as second post-deployment accuracy of the to-be-deployed model; and a fourth determining sub-unit configured to, determine the deployment accuracy of the to-be-deployed model, according to a ratio of the second post-deployment accuracy of the to-be-deployed model to second pre-deployment accuracy of the to-be-deployed model; wherein the second pre-deployment accuracy of detecting the test data in the preset model framework through the original model corresponding to the to-be-deployed model.

The standard detection box corresponding to each of the second input objects is identified by an upper left standard coordinate (x1, y1) and a lower right standard coordinate (x2, y2), and the output detection box corresponding to each of the second input objects is identified by an upper left output coordinate (xx1, yy1) and a lower right output coordinate (xx2, yy2);

the judgment sub-unit specifically configured to:

if xxx1 is less than xxx2, and yyy1 is less than yyy2, determine that the output detection box of the second input object is overlapped with the standard detection box of the second input object; wherein, xxx1 is a greater one of x1 and xx1, xxx2 is a smaller one of x2 and xx2, yyy1 is a greater one of y1 and yy1, and yyy2 is a smaller one of y2 and yy2;

the calculating sub-unit specifically configured to:

if the output detection box of the second input object is overlapped with the standard detection box of the second input object, calculate the overlapping area according to xxx2, xxx1, yyy2 and yyy1, and calculate the total coverage area according to the upper left standard coordinate, the lower right standard coordinate, the upper left output coordinate, the lower right output coordinate, xxx2, xxx1, yyy2 and yyy1; and calculate the ratio of the overlapping area to the total coverage area.

The target feedback information includes preset transmission interface information;

the transmission unit specifically configured to:

if receiving the preset transmission interface information returned by the specified chip, transmitting the test data to the specified chip, and then indicate the specified chip to process the test data via the to-be-deployed model that has been deployed, according to the preset transmission interface information.

The deployment file includes a first file and a second file. The first file includes setup parameter information of the to-be-deployed model, and the second file includes structural orders of each of the at least two to-be-deployed modules in the to-be-deployed model, and module deployment information of each of the at least two to-be-deployed modules stored in turn.

The deployment information includes at least one of structure parameter information, storage size information, storage address information, deployment location information and machine codes of each to-be-deployed module.

The property information includes information transmission modes configured to indicate that an information transmission mode of a corresponding layer includes a parallel transmission mode and/or a serial transmission mode, the deployment information of the deployment file including data processing resources respectively corresponding to each of the at least two to-be-deployed modules and determined according to the information transmission modes of the layers in the to-be-deployed modules.

The property information includes data quantity information configured to indicate that amount of data is involved in the corresponding layer, the deployment information of the deployment file including computing resources respectively corresponding to each of the at least two to-be-deployed modules and determined according to the data quantity information of the layers in the to-be-deployed modules.

The model deployment device further includes:

an obtaining unit configured to obtain an original model that floating point numbers are applied therein; and a fixed-point unit configured to perform a fixed-point operation on the original model to obtain the to-be-deployed model.

It should be noted that information interaction and execution processes between the above devices/units are based on the same conception as the embodiments of the present disclosure, therefore, specific functions and technical effects brought by the above devices/units can be detailed in the embodiments of the present method, which is not repeated here.

An ordinary skilled person in the art can be clearly understood that: for convenient and simple description, the above functional units and modules are only divided to illustrate with examples. In a practical application, different functional units and modules can be assigned to implement the above functions according to needs, that is, internal structures of the apparatus can be divided into different functional units or modules to complete all or part of the functions described above. Each functional unit or each module in embodiments of the present disclosure can be integrated in a processing unit, or each unit can be physically existed separately, or two or more units can be integrated in a unit. The above-mentioned integrated units can be realized in the form of hardware or software functional units. In addition, specific names of each functional unit and each module are only to conveniently distinguish with each other, but are not limited to the protection scope of the present disclosure. A specific working process of the units and modules in the above system can be referred to the corresponding process in the embodiment of the above method, which is not repeated here.

Figure 6:
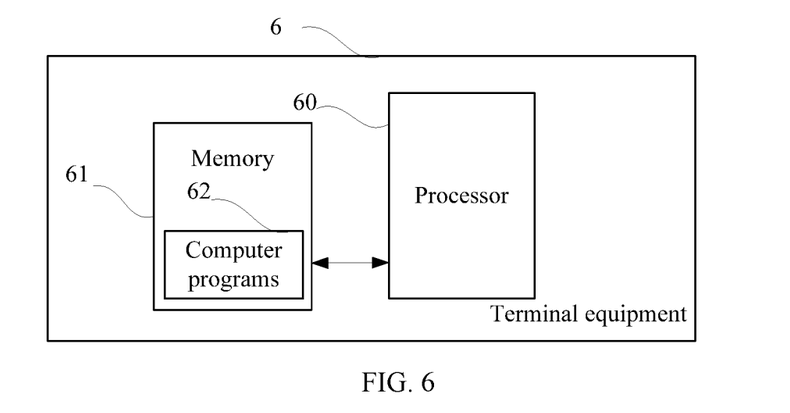
FIG. 6 is a schematic diagram of a terminal equipment in accordance with an embodiment of the present disclosure.

A fourth embodiment:

FIG. 6 is a schematic diagram of a terminal equipment in accordance with an embodiment of the present disclosure. Referring to FIG. 6, the terminal equipment 6 includes: a processor 60, a memory 61 and computer programs 62 stored in the memory 61 and performed by the processor 60 to implement steps of the model deployment method mentioned above, such as steps S101-S103 shown in FIG. 1. Or, the processor 60 is configured to perform the computer programs 62 to implement functions of modules/units of the embodiments described in the model deployment device mentioned above, such as the functions of the units 501-503 shown in FIG. 5.

The computer program 62 can be segmented into one or more modules/units that are stored in the memory 61 and performed by the processor 60 to implement the present disclosure. The one or more modules/units can be a series of computer program instruction segments capable of performing specific functions, which are configured to describe execution of the computer programs 62 in the terminal equipment 6. For example, the computer programs 62 can be segmented to a dividing unit, a generating unit and a sending unit, and specific functions of each of the dividing unit, the generating unit and the sending unit are as follows:

the dividing unit configured to divide a preset to-be-deployed model into at least two to-be-deployed modules, according to property information respectively corresponding to at least two layers of the preset to-be-deployed model;

the generating unit configured to generate a deployment file according to each of the at least two to-be-deployed modules; wherein the deployment file includes deployment information configured for deploying each of the at least two to-be-deployed modules; and the sending unit configured to send the deployment file to a specified chip to indicate the specified chip to deploy the to-be-deployed model according to the deployment file.

The terminal equipment 6 can be a computing device such as a desktop computer, a notebook, a handheld computer and a cloud server. The terminal equipment 6 can include, but not limited to, a processor 60 and a memory 61. An ordinary skilled person in the art can be understood that: FIG. 6 is only an example of the terminal equipment 6, but not limited to include more or less components shown in FIG. 6, or some combination of components, or different components. For example, the terminal equipment 6 can also include input/output devices, network access devices, buses, etc.

The processor 60 can be a Central Processing Unit (CPU), other general-purpose processors, a Digital Signal Processor (DSP), an Application Specific Integrated Circuit (ASIC), a Field-Programmable Gate Array (FPGA) or other programmable logic devices, discrete gates or transistor logic devices, discrete hardware components, etc. The general-purpose processor can be a microprocessor or any conventional processors, etc.

The memory 61 can be an internal storage unit within the terminal equipment 6, such as a hard disk or a memory of the terminal equipment 6. The memory 61 can also be an external storage device of the terminal equipment 6, such as a plug-in hard disk, a Smart Media Card (SMC), a Secure Digital (SD) Card, and a Flash Card, etc. equipped on the terminal equipment 6. Furthermore, the memory 61 can also include both an internal storage unit thereof and an external storage device. The memory 61 is configured to store computer programs and other programs and data required by the terminal equipment 6, and temporarily store data that has been output or to be output.

An ordinary skilled person in the art can be clearly understood that: for convenient and simple description, the above functional units and modules are only divided to illustrate with examples. In a practical application, different functional units and modules can be assigned to implement the above functions according to needs, that is, internal structures of the apparatus can be divided into different functional units or modules to complete all or part of the functions described above. Each functional unit or each module in embodiments of the present disclosure can be integrated in a processing unit, or each unit can be physically existed separately, or two or more units can be integrated in a unit. The above-mentioned integrated units can be realized in the form of hardware or software functional units. In addition, specific names of each functional unit and each module are only to conveniently distinguish with each other, but are not limited to the protection scope of the present disclosure. A specific working process of the units and modules in the above system can be referred to the corresponding process in the embodiment of the above method, which is not repeated here.

In the above embodiments, the description of each embodiment has its own emphasis, and parts without detailed description in one embodiment can be referred to relevant description of other embodiments.

An ordinary skilled person in the art can be aware that various illustrative units and algorithm steps described in connection with the embodiments disclosed herein can be implemented as electronic hardware or combinations of computer software and electronic hardware. Whether these functions are performed in hardware or software modes depends on a specific application of the technical solution and design constraints. Professionals can use different methods for each specific application to achieve the functions described, but such implementation should not be considered outside the scope of this application.

It should be understood that the disclosed apparatus/terminal equipment and method in the embodiments provided by the present disclosure can be implemented in other ways. For example, the embodiments of the apparatus/terminal equipment described above are merely schematic; for example, the division of the modules or units is merely a division of logical functions, which can also be realized in other ways; for example, multiple units or components can combined or integrated into another system, or some features can be ignored or not implemented. On the other hand, the coupling, direct coupling or communication connection shown or discussed may be achieved through some interfaces, indirect coupling or communication connection between devices or units may electrical, mechanical or otherwise.

The units described as separation parts can or can't be physically separated, and the parts displayed as modules can or can't be physical units, that is, they can be located in one place, or can be distributed on a plurality of network units. Some or all of the units can be selected according to actual needs to implement the purpose of the present disclosure.

In addition, each functional unit in each embodiment of the present disclosure can be integrated in a processing unit, or each unit can be separately formed with a physical form, or two or more units can be integrated in one unit. The above integrated units can be implemented either in a hardware form or in the form of hardware plus software function modules.

The integrated modules/units can be stored in a computer readable memory if implemented in the form of software program modules and sold or used as a separate product. Based on this understanding, all or part of the steps in the method of the above embodiment in the present disclosure can be implemented by computer program instructions of relevant hardware which can be stored in a computer readable storage medium, the computer program can be performed by the processor to implement the steps in the various methods of the above embodiments. Furthermore, the computer program includes computer program codes, which can be in a form of source codes, object codes, executable files or some intermediate forms, etc. The computer readable medium can include: any entities or devices capable of carrying the computer program codes, a recording medium, a U disk, a mobile hard disk drive, a diskette or a CD-ROM, a computer Memory, a Read-Only Memory (ROM), a Random Access Memory (RAM), an electrical carrier signal, a telecommunication signal and a software distribution medium, etc. It should be noted that content contained in the computer readable storage medium can be added or reduced as appropriate to the requirements of legislation and patent practice within the jurisdictions, for example, in some jurisdictions, in accordance with legislation and patent practice, computer readable storage medium do not include electrical carrier signals and telecommunications signals.

A computer program product according to an embodiment of the present disclosure is provided and performed by the terminal equipment to implement steps of the model deployment method mentioned above.

The above embodiments are used only to describe, but not limited to, the technical solution of the present disclosure. Although the features and elements of the present disclosure are described as embodiments in particular combinations, an ordinary skilled person in the art should understand that: each feature or element can be used alone or in other various combinations within the principles of the present disclosure to the full extent indicated by the broad general meaning of the terms in which the appended claims are expressed. Any variation or replacement made by one of ordinary skill in the art without departing from the spirit of the present disclosure shall fall within the protection scope of the present disclosure.

What is claimed is:

1. A model deployment method comprising:
   dividing a preset to-be-deployed model into at least two to-be-deployed modules, according to property information respectively corresponding to at least two layers of the preset to-be-deployed model;
   generating a deployment file according to each of the at least two to-be-deployed modules, wherein the deployment file comprises deployment information configured for deploying each of the at least two to-be-deployed modules;
   sending the deployment file to a specified chip to indicate the specified chip to deploy the to-be-deployed model according to the deployment file;
   after sending the deployment file to the specified chip, the method further comprising:
   if receiving target feedback information returned by the specified chip, transmitting preset test data to the specified chip, and then indicate the specified chip to process the test data via the to-be-deployed model that has completed by deployment, according to the target feedback information;
wherein the target feedback information is configured to indicate that the to-be-deployed model has been deployed in the specified chip; and
if obtaining processing results for the test data returned by the specified chip, determining deployment accuracy that the to-be-deployed model has been deployed in the specified chip according to the processing results; wherein the deployment accuracy is configured to indicate that an accuracy difference that the to-be-deployed model has been deployed in the specified chip is relative to an original model corresponding to the to-be-deployed model in a preset model framework.

2. The model deployment method as claimed in claim 1, wherein the property information comprises operation type information configured to indicate that a corresponding layer is configured to perform a linear operation or a nonlinear operation; the deployment information of the deployment file comprising deployment locations corresponding to each of the at least two to-be-deployed modules that are determined according to the operation type information; wherein the deployment location of any one of the at least two to-be-deployed modules is a digital signal processor or a neural network processor.

3. The model deployment method as claimed in claim 1, wherein the to-be-deployed model comprises a classification model, and the test data comprises a plurality of first input objects and a standard classification result corresponding to each of the plurality of first input objects, the standard classification result corresponding to each of the plurality of first input objects comprising a plurality of standard classification items and a standard confidence corresponding to each of the plurality of standard classification items; for each first input object, sorting a sequence number corresponding to each standard classification item of the first input object according to a size of the standard confidence corresponding to each standard classification item of the first input object;
the processing results comprising output classification results corresponding to each of the plurality of first input objects, the output classification result corresponding to each of the plurality of the first input objects comprising a plurality of output classification items and an output confidence corresponding to each of the plurality of output classification items; for each first input object, sorting a sequence number corresponding to each output classification item of the first input object according to a size of the output confidence corresponding to each output classification item of the first input object;
the step of if obtaining processing results for the test data returned by the specified chip, determining deployment accuracy that the to-be-deployed model has been deployed in the specified chip according to the processing results, comprising:
for each first input object, obtaining a target output classification item in the output classification result of the first input object, and a target standard classification item in the standard classification result of the first input object;
wherein, a sequence number of the target output classification item is corresponding to a sequence number of the target standard classification item;
if the target output classification item is the same as the target standard classification item, determining that the first input object has been successfully classified;
taking a ratio of a number of the first input objects that has been successfully classified to a number of the first input objects contained in the test data as first post-deployment accuracy of the to-be-deployed model; and
determining deployment accuracy of the to-be-deployed model, according to a ratio of the first post-deployment accuracy of the to-be-deployed model to first pre-deployment accuracy of the to-be-deployed model; wherein the first pre-deployment accuracy is classification accuracy that the test data is classified by the original model corresponding to the to-be-deployed model in the preset model framework.

4. The model deployment method as claimed in claim 1, wherein the to-be-deployed model comprises a detection model, and the test data comprises a plurality of second input objects and a standard detection box corresponding to each of the plurality of second input objects, the processing results comprising an output detection box corresponding to each of the plurality of second input objects;
the step of if obtaining processing results for the test data returned by the specified chip, determining deployment accuracy that the to-be-deployed model has been deployed in the specified chip according to the processing results, comprising:
for each second input object, determining whether the output detection box of the second input object is overlapped with the standard detection box of the second input object;
if the output detection box of the second input object is overlapped with the standard detection box of the second input object, calculating a ratio of an overlapping area that the output detection box of the second input object is overlapped with the standard detection box of the second input object to a total coverage area formed by the output detection box and the standard detection box;
if the ratio is greater than a preset threshold, determining that the second input object has been successfully detected;
taking a ratio of a number of the second input objects that are successfully detected to a number of the second input objects contained in the test data as second post-deployment accuracy of the to-be-deployed model; and
determining deployment accuracy of the to-be-deployed model, according to a ratio of the second post-deployment accuracy of the to-be-deployed model to second pre-deployment accuracy of the to-be-deployed model; wherein the second pre-deployment accuracy of detecting the test data in the preset model framework through the original model corresponding to the to-be-deployed model.

5. The model deployment method as claimed in claim 4, wherein the standard detection box corresponding to each of the second input objects is identified by an upper left standard coordinate (x1, y1) and a lower right standard coordinate (x2, y2), and the output detection box corresponding to each of the second input objects is identified by an upper left output coordinate (xx1, yy1) and a lower right output coordinate (xx2, yy2);
the step of for each second input object, determining whether the output detection box of the second input object is overlapped with the standard detection box of the second input object, comprising:
if xxx1 is less than xxx2, and yyy1 is less than yyy2, determining that the output detection box of the second input object is overlapped with the standard detection box of the second input object; wherein xxx1 is a greater one of x1 and xx1, xxx2 is a smaller one of x2 and xx2, yyy1 is a greater one of y1 and yy1, and yyy2 is a smaller one of y2 and yy2;

the step of if the output detection box of the second input object is overlapped with the standard detection box of the second input object, calculating a ratio of the overlapping area that the output detection box of the second input object is overlapped with the standard detection box of the second input object to the total coverage area formed by the output detection box and the standard detection box, comprising:

if the output detection box of the second input object is overlapped with the standard detection box of the second input object, calculating the overlapping area according to xxx2, xxx1, yyy2 and yyy1, and calculating the total coverage area according to the upper left standard coordinate, the lower right standard coordinate, the upper left output coordinate, the lower right output coordinate, xxx2, xxx1, yyy2 and yyy1; and calculating the ratio of the overlapping area to the total coverage area.

6. The model deployment method as claimed in claim 1, wherein the target feedback information comprises preset transmission interface information;

the step of if receiving the target feedback information returned by the specified chip, transmitting preset test data to the specified chip, and then indicate the specified chip to process the test data via the to-be-deployed model that has been deployed, according to the target feedback information, comprising:

if receiving the preset transmission interface information returned by the specified chip, transmitting the test data to the specified chip, and then indicate the specified chip to process the test data via the to-be-deployed model that has been deployed, according to the preset transmission interface information.

7. The model deployment method as claimed in claim 1, wherein the deployment file comprises a first file comprising setup parameter information of the to-be-deployed model, and a second file comprising structural orders of each of the at least two to-be-deployed modules in the to-be-deployed model, and module deployment information of each of the at least two to-be-deployed modules stored in turn.

8. The model deployment method as claimed in claim 1, wherein the deployment information comprises at least one of structure parameter information, storage size information, storage address information, deployment location information and machine codes of each to-be-deployed module.

9. The model deployment method as claimed in claim 1, wherein the property information comprises information transmission modes configured to indicate that an information transmission mode of a corresponding layer comprises a parallel transmission mode and/or a serial transmission mode, the deployment information of the deployment file comprising data processing resources respectively corresponding to each of the at least two to-be-deployed modules and determined according to the information transmission modes of the layers in the to-be-deployed modules.

10. The model deployment method as claimed in claim 1, wherein the property information comprises data quantity information configured to indicate that amount of data is involved in the corresponding layer, the deployment information of the deployment file comprising computing resources respectively corresponding to each of the at least two to-be-deployed modules and determined according to the data quantity information of the layers in the to-be-deployed modules.

11. The model deployment method as claimed in claim 1, wherein before the step of dividing a preset to-be-deployed model into at least two to-be-deployed modules, according to property information respectively corresponding to at least two layers of the preset to-be-deployed model, the model deployment method further comprising:

obtaining an original model that floating point numbers are applied therein; and performing a fixed-point operation on the original model to obtain the to-be-deployed model.

12. A terminal equipment comprising a memory, a processor and computer programs stored in the memory and performed by the processor to implement steps of a model deployment method, the model deployment method comprising:

dividing a preset to-be-deployed model into at least two to-be-deployed modules, according to property information respectively corresponding to at least two layers of the preset to-be-deployed model;

generating a deployment file according to each of the at least two to-be-deployed modules, wherein the deployment file comprises deployment information configured for deploying each of the at least two to-be-deployed modules;

sending the deployment file to a specified chip to indicate the specified chip to deploy the to-be-deployed model according to the deployment file;

after sending the deployment file to the specified chip, the method further comprising:

if receiving target feedback information returned by the specified chip, transmitting preset test data to the specified chip, and then indicate the specified chip to process the test data via the to-be-deployed model that has completed by deployment, according to the target feedback information; wherein the target feedback information is configured to indicate that the to-be-deployed model has been deployed in the specified chip; and if obtaining processing results for the test data returned by the specified chip, determining deployment accuracy that the to-be-deployed model has been deployed in the specified chip according to the processing results; wherein the deployment accuracy is configured to indicate that an accuracy difference that the to-be-deployed model has been deployed in the specified chip is relative to an original model corresponding to the to-be-deployed model in a preset model framework.

* * * * *